United States Patent
Koyama (10) Patent No.: US 7,382,698 B2
(45) Date of Patent: Jun. 3, 2008

(54) OPTICAL INFORMATION RECORDING/REPRODUCING APPARATUS HAVING TILT CORRECTION MECHANISM AND METHOD THEREFOR

(75) Inventor: Osamu Koyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 607 days.

(21) Appl. No.: 10/992,736

(22) Filed: Nov. 22, 2004

(65) Prior Publication Data
US 2005/0122860 A1 Jun. 9, 2005

(30) Foreign Application Priority Data
Dec. 4, 2003 (JP) .............................. 2003-405909

(51) Int. Cl.
*G11B 7/09* (2006.01)
(52) U.S. Cl. ................................ 369/44.32; 369/44.25
(58) Field of Classification Search ...................... None
See application file for complete search history.

(56) References Cited

U.S. PATENT DOCUMENTS

| | | | | |
|---|---|---|---|---|
| 4,803,579 | A | 2/1989 | Koyama | 360/114 |
| 4,813,032 | A | 3/1989 | Koyama | 369/13 |
| 4,953,124 | A | 8/1990 | Koyama | 365/122 |
| 5,029,261 | A | 7/1991 | Koyama et al. | 250/201.5 |
| 5,293,371 | A | 3/1994 | Koyama | 369/110 |
| 5,293,569 | A | 3/1994 | Koyama | 369/112 |
| 5,347,503 | A | 9/1994 | Koyama et al. | 369/44.32 |
| 5,404,346 | A | 4/1995 | Koyama et al. | 369/44.32 |
| 5,502,698 | A * | 3/1996 | Mochizuki | 369/44.32 |
| 5,546,373 | A | 8/1996 | Koyama | 369/120 |
| 5,608,716 | A | 3/1997 | Koyama et al. | 369/275.1 |
| 5,627,807 | A * | 5/1997 | Abe | 369/44.29 |
| 5,745,449 | A | 4/1998 | Koyama | 369/44.32 |
| 6,141,302 | A | 10/2000 | Koyama et al. | 369/44.24 |
| 6,157,600 | A * | 12/2000 | Nakamura et al. | 369/44.32 |
| 6,282,165 | B1 | 8/2001 | Koyama et al. | 369/118 |
| 2004/0027937 | A1* | 2/2004 | Han | 369/44.29 |

FOREIGN PATENT DOCUMENTS

JP 2003-45058 2/2003

* cited by examiner

*Primary Examiner*—Joseph Feild
*Assistant Examiner*—Nathan Danielsen
(74) *Attorney, Agent, or Firm*—Fitzpatrick, Cella, Harper & Scinto (57) ABSTRACT

An optical information recording/reproducing apparatus and are provided under a state where a focus servo is driven, a tracking error signal recorded on the recording medium or a sum signal of a photodetector is generated from a pencil of light guided onto the photodetector. Then, the signal amplitude of the tracking error signal or the sum signal of the photodetector is measured. Next, the relative tilt between the recording medium and the objective lens is roughly corrected until the signal amplitude reaches a threshold value determined in advance. After the rough correction, under a state where a tracking servo is driven on a predetermined track, tracking is performed on the predetermined track, detecting a tilt detection signal, and the relative tilt between the recording medium and the objective lens is finely corrected based on the tilt detection signal.

7 Claims, 8 Drawing Sheets

OPTICAL INFORMATION RECORDING/REPRODUCING APPARATUS HAVING TILT CORRECTION MECHANISM AND METHOD THEREFOR

BACKGROUND OF THE INVENTION

1. Field of the Invention

The present invention relates to an optical information recording/reproducing apparatus and an optical information recording/reproducing method, in particular, an optical information recording/reproducing apparatus and an optical information recording/reproducing method with which a relative tilt between a recording medium and an objective lens is corrected.

2. Related Background Art

It is well known that a warpage or an inclination (tilt) of an optical disk that is a recording medium lowers information recording/reproducing performance. In view of this problem, tilt correction means shown in FIGS. 7 to 9 have conventionally been used, for instance.

Figure 7:
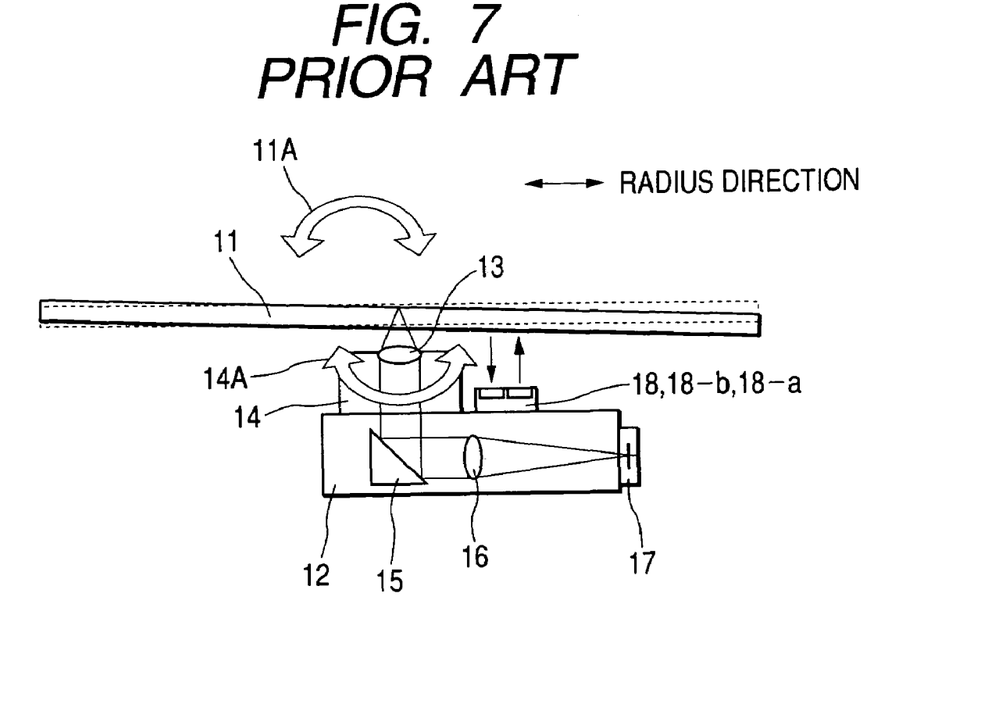
FIG. 7 is an explanatory diagram of an example of a tilt detection means and a tilt correction means.

FIG. 7 is an explanatory diagram of an example of a tilt detection means and a tilt correction means. An optical pickup 12 records/reproduces information onto/from an optical disk 11. The optical pickup 12 images a minute light spot on a predetermined track of the optical disk 11 using an objective lens 13, condenses reflection light thereof using the objective lens 13, guides a pencil of light onto a sensor 17 through a mirror 15 and a sensor lens 16, and performs recording/reproduction of information using a photoelectrically converted signal. A tilt actuator 14 holds the objective lens 13 and performs focusing and tracking in order to cause the light spot to trace the predetermined track. When doing so, as indicated by an arrow 11A, the optical disk 11 generates a tilt mainly in a disk radial direction due to changes in temperature, humidity, or the like, which results in a situation where the optical disk 11 does not exist perpendicular to the optical axis of the objective lens 13 of the optical pickup 12. When such a tilt occurs, a side lobe due to a coma aberration occurs to the light spot imaged on the predetermined track of the optical disk and crosstalk of information occurs between adjacent tracks, which makes it difficult to perform precise information recording/reproduction.

In order to solve this problem, in the optical pickup 12 shown in FIG. 7, a tilt sensor 18 is provided which is an element that measures a disk tilt amount of the optical disk 11. The tilt sensor measures the disk tilt amount of the optical disk 11 by emitting a pencil of light using a light emitting element 18-a and receiving and detecting reflection light thereof from a disk surface using a multi-segment light receiving element 18-b. For instance, the light receiving element 18-b is divided into two segments in a radial direction and is adjusted so that the same amount of light is incident on both of the segments when the disk tilt amount is zero (indicated by a dotted line) and the amount of light incident on one of the segments becomes larger than the amount of light incident on the other thereof when a disk tilt occurs (indicated by a solid line). With this construction, it becomes possible to measure a disk tilt amount. In addition, although not illustrated in the drawing, the tilt actuator 14 has a magnetic circuit and is given a function of tilting the objective lens 13 in the direction of an arrow 14A by devising the magnetic circuit. By giving a disk tilt amount corresponding to the tilt of the optical disk detected by the tilt sensor 18 to the objective lens 13 so that the optical disk 11 and the objective lens 13 become approximately parallel to each other, the coma aberration occurring to the light spot is reduced and precise information recording/reproduction becomes possible.

Figure 8:
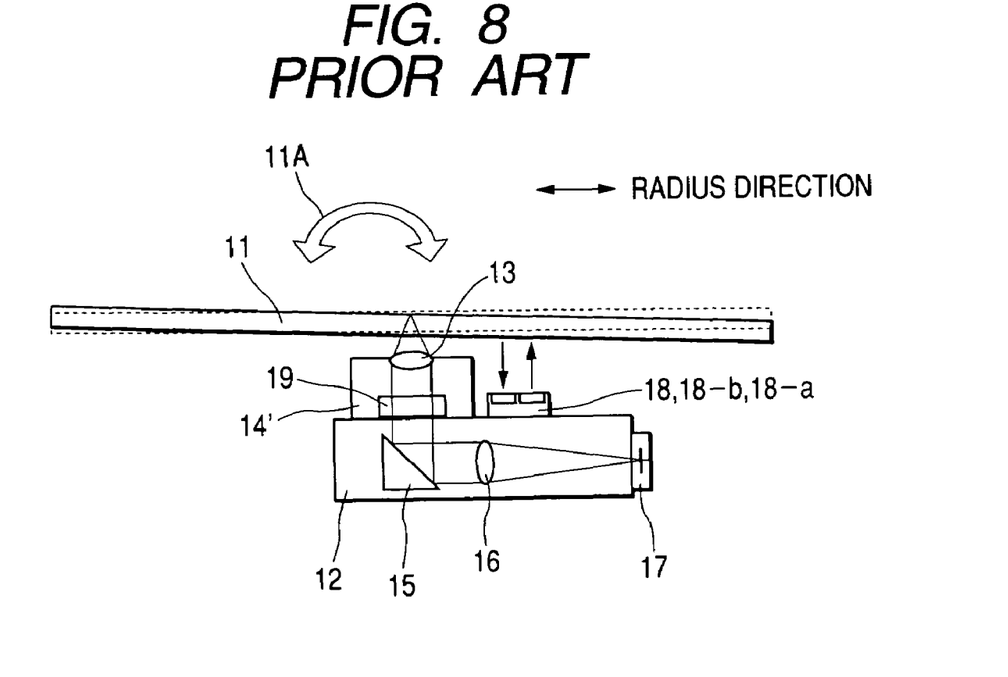
FIG. 8 is an explanatory diagram of another example of the tilt correction means.

FIG. 8 is an explanatory diagram of another example of the tilt correction means.

An optical pickup shown in FIG. 8 also has conventionally been proposed in which a liquid crystal tilt correction element 19 is used instead of the tilt actuator 14 having the function of inclining the objective lens. Each constituent element that is the same as in FIG. 7 is given the same reference numeral. An actuator 14' is an ordinary actuator that performs focusing and tracking in order to cause a light spot to trace a predetermined track. A surface, through which a pencil of light passes, of the liquid crystal tilt correction element 19 is composed of a multi-segment liquid crystal cell and it is possible to drive segments thereof independently of each other. With this construction, it becomes possible to give a desired optical phase difference to the pencil of light passing through the liquid crystal cell. Therefore, by controlling the segments in accordance with a disk tilt amount of an optical disk 11 detected by a tilt sensor 18 so that a coma aberration resulting from a tilt of the optical disk 11 is canceled out, the coma aberration occurring to the light spot is reduced and precise information recording/reproduction becomes possible. It is possible to drive the liquid crystal tilt correction element 19 with a relatively small amount of electric power, so this element 19 is suited for implementation in a portable optical disk apparatus.

The tilt sensor 18 is capable of measuring a tilt of the optical disk 11 with a simple structure and therefore is widely used across the optical disk field. With the tilt sensor 18, however, the relative tilt between the objective lens 13 and the optical disk 11 is not directly measured, so there is a problem that it is impossible to perform correction of a coma aberration with a sufficient degree of precision. Also, when the tilt sensor 18 is used in combination with a tilt correction means, such as the tilt actuator 14 and the liquid crystal tilt correction element 19, and the relative tilt itself between the optical disk 11 and the optical pickup 12 is not corrected, it is difficult to perform tilt control with a closed loop structure and it is impossible to attain a sufficient degree of correction accuracy.

Figure 9:
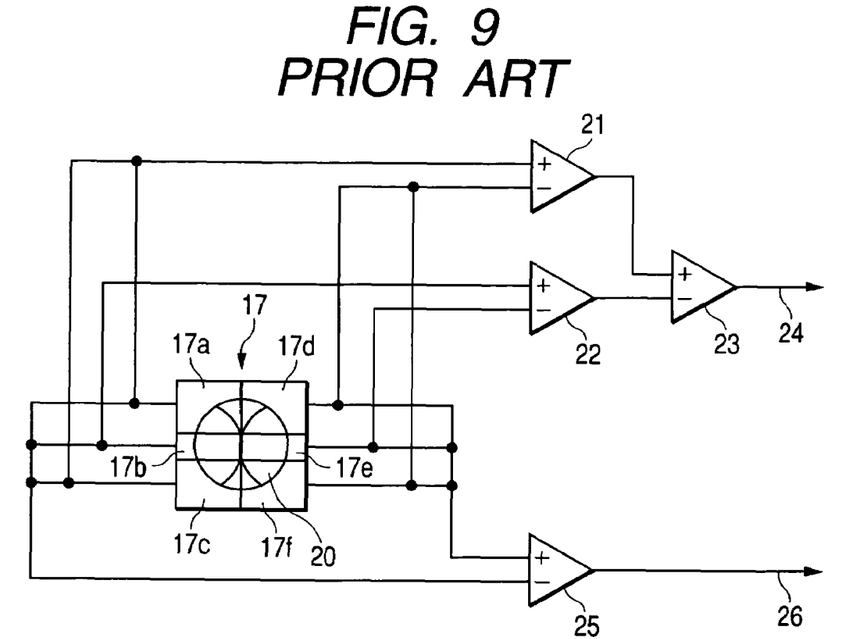
FIG. 9 is an explanatory diagram of another example of the tilt detection means.

In view of these problems, as an alternative to the tilt sensor 18 separately installed in the optical pickup 12, a method is proposed with which a disk tilt amount is measured with precision directly from a pencil of reflection light from an optical disk (see Japanese Patent Application Laid-Open No. 2003-045058, for instance). An example thereof is shown in FIG. 9. Each constituent element that is the same as that in FIG. 7 is given the same reference numeral. FIG. 9 is an explanatory diagram of an example of a tilt detection means and a tilt correction means and illustrates an enlarged view of a sensor 17 that receives a pencil of reflection light from an optical disk and a method of generating a tilt detection signal. The sensor 17 is composed of six sensor segments 17a to 17f and the lateral direction in this drawing corresponds to the radial direction of the optical disk. A diffraction pattern 20 from a tracking guide groove of the optical disk is superimposed on a light spot on the sensor and FIG. 9 shows a case where a light spot on the optical disk is positioned at the center of the guide groove. A push-pull system is used for tracking and, after each sensor segment output passes through each amplifier (not shown), a tracking error signal 26 is generated from a difference between an output sum of the right sensor segments and an output sum of the left sensor segments.

tracking error (TE) signal=$(17d+17e+17f)-(17a+17b+17c)$ (1)

A differential amplifier 25 generates a differential output from the right and left sensor segment outputs and the tracking error signal 26 is obtained from the output.

Also, a tilt detection signal 24 is generated from a difference between the respective outputs of the inner left and right sensor segments (17b and 17e) and a difference between the respective output sums of the outer left and right sensor segments (17a, 17c, 17d, and 17f).

tilt detection signal=$(17a+17c-17d-17f)-k\times(17b-17e)$ (2)

where k is a constant that is greater than "1". A differential amplifier 21 finds the difference between the respective output sums of the outer left and right sensor segments (17a, 17c, 17d, and 17f) and a differential amplifier 22 finds the difference between the respective outputs of the inner right and left sensor segments (17b and 17e). Also, a differential amplifier 23 finds a difference between an output of the differential amplifier 21 and an output of the differential amplifier 22 multiplied by "k". When tracking control is closed, it is possible to detect the tilt detection signal 24 precisely. Consequently, in contrast to the construction using the tilt sensor 18 where tilt detection accuracy is on the order of 0.5° at most, the tilt detection accuracy is improved to 0.1°. This is because it is possible to directly observe a pencil of reflection light from the optical disk. Also, when the tilt detection signal obtained with Equation (2) given above is used in combination with a tilt correction means such as the tilt actuator 14 and the liquid crystal tilt correction element 19, it becomes possible to obtain a loop control structure with ease, which makes it possible to improve the tilt correction accuracy.

It is possible to roughly estimate a coma aberration due to an inclination of an optical disk using the following equation:

coma aberration=$d\times NA^3/\lambda$ (3)

where d is a disk substrate thickness, NA is the numerical aperture of an objective lens, and $\lambda$ is the wavelength of a light source.

In recent years, in order to improve the recording density of optical disks, development of a violet semiconductor laser has remarkably advanced and is now reaching the level of practical application. In addition, many attempts have been made to increase the objective lens NA. However, when the violet semiconductor laser is used, a comma aberration occurring due to a disk tilt is increased by around 1.6 times as compared with a case where a red laser is used. Similarly, when the NA is increased from 0.6 to 0.65, the coma aberration is increased by around 1.3 times. Also, it can be understood that when both of these operations are implemented at the same time in an optical pickup for DVDs ($\lambda$=660 nm, NA=0.6), the coma aberration occurring due to a disk tilt is increased by around 2.1 times.

Figure 10:
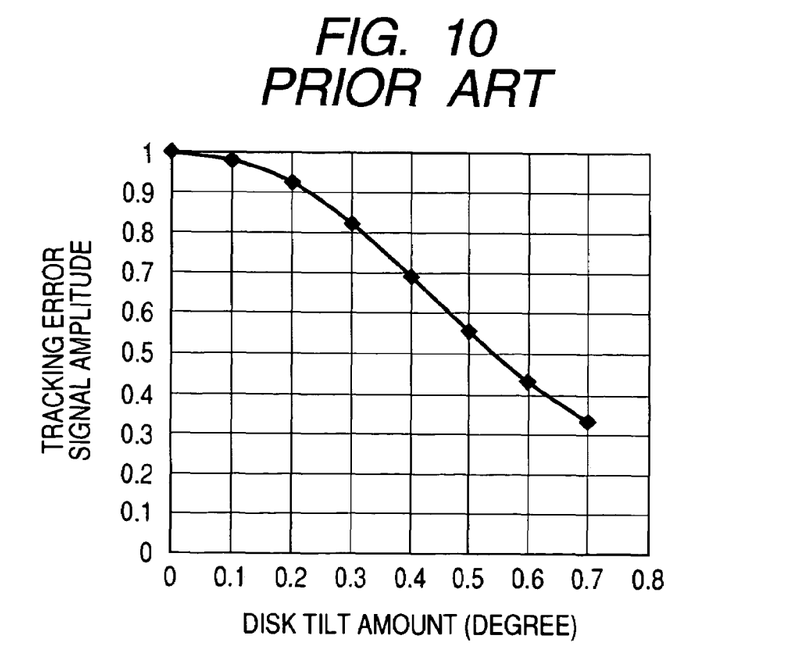
FIG. 10 is an explanatory diagram illustrating how a tracking error signal level decreases due to a relative tilt between a recording medium and an objective lens.

FIG. 10 provides estimation of such influences through simulation and illustrates how a tracking error signal level is lowered due to a relative tilt between a recording medium and an objective lens. In FIG. 10, $\lambda$ is set at 405 nm, the NA is set at 0.65, and the disk substrate thickness is set at 0.6 mm. Also, a disk tilt amount is plotted on the horizontal axis and a tracking error signal amplitude of a push-pull system is plotted on the vertical axis. Further, a land-groove recording system is used in which a track pitch is set at 0.32 µm (pitch between a land center and a groove center=0.32 µm) and the depth of guide grooves is set at 30 nm. As to the tracking error signal amplitude, a result of division of a difference output of a two-segment sensor by a sum output thereof is used and normalization has been made by setting an amplitude in the case where no disk tilt exists at "1". It can be seen from this drawing that when a disk tilt of 0.5° occurs, the tracking error signal amplitude is lowered to around one half. From this fact, it can be understood that precise tilt correction is indispensable.

The tilt detection accuracy of the tilt sensor 18 greatly depends on the installation accuracy of the sensor. Generally, however, when the tilt sensor 18 is applied to a compact and portable optical pickup, the installation position of the tilt sensor 18 is restricted and it is difficult to improve the installation accuracy thereof. Also, when the tilt sensor 18 is used in combination with a tilt correction means, such as the tilt actuator 14 and the liquid crystal tilt correction element 19, and a relative tilt itself between the optical disk and the optical pickup is not corrected, it is difficult to perform tilt control with a closed loop structure, the tilt correction accuracy obtained is on the order of 0.5° at most, and it is impossible to obtain sufficient tilt correction accuracy under the conditions described above. On the other hand, with the method with which a disk tilt amount is measured with precision directly from a pencil of reflection light from an optical disk, the tilt detection accuracy is improved to around 0.1° and when this method is combined with a tilt correction means such as the tilt actuator 14 and the liquid crystal tilt correction element 19, it becomes possible to obtain a closed loop control structure with ease, which makes it possible to improve the accuracy. With this method, however, it is required to drive a tracking servo in order to measure a disk tilt amount. When the disk tilt amount is 0.5° or more, the amplitude of a tracking error signal is lowered to around one half as shown in FIG. 10, so it becomes difficult to drive the tracking servo, a possibility that tracking pull-in will end in failure is increased, and it becomes difficult to measure the disk tilt amount.

SUMMARY OF THE INVENTION

According to the present invention, there are provided an optical information recording/reproducing apparatus and an optical information recording/reproducing method, with which it is possible to improve the accuracy of correction of a relative tilt between a recording medium and an objective lens.

An optical information recording/reproducing apparatus according to the present invention includes: a light source portion; an objective lens that gathers a pencil of light from the light source portion onto a recording medium; an optical system that guides a returning pencil of light from the recording medium onto a photodetector; means for generating a tracking error signal with respect to a predetermined track on the recording medium from the pencil of light guided onto the photodetector; means for performing tracking on the predetermined track on the recording medium based on the tracking error signal; means for generating a tilt detection signal by detecting a relative tilt between the recording medium and the objective lens from the pencil of light guided onto the photodetector; a tilt correction means for correcting the relative tilt between the recording medium and the objective lens based on the tilt detection signal; means for generating a predetermined signal recorded on the recording medium from the pencil of light guided onto the photodetector under a state where a focus servo is driven; and means for measuring a signal level of the predetermined signal, wherein the tilt correction means roughly corrects the relative tilt between the recording medium and the objective lens until the signal level reaches a threshold value determined in advance, and after the rough correction, under a state where the tracking means performs tracking on the predetermined track, the tilt detection signal generation means generates the tilt detection signal and the tilt correction means finely corrects the relative tilt between the recording medium and the objective lens based on the tilt detection signal.

Further, an optical information recording/reproducing method according to the present invention includes: gathering a pencil of light from a light source portion onto a recording medium by an objective lens and receiving a returning pencil of light from the recording medium with a photodetector through an optical system; driving a focus servo on the pencil of light based on an output of the photodetector; generating a predetermined signal recorded on the recording medium based on the output of the photodetector; measuring a signal level of the predetermined signal; roughly correcting a relative tilt between the recording medium and the objective lens until the signal level reaches a threshold value determined in advance; detecting, after the rough correction, a tilt detection signal indicating the relative tilt between the recording medium and the objective lens based on the output of the photodetector under a state where a tracking servo is driven on a predetermined track based on the output of the photodetector; and finely correcting the relative tilt between the recording medium and the objective lens based on the tilt detection signal.

DESCRIPTION OF THE PREFERRED EMBODIMENTS

Hereinafter, embodiments of the present invention will be described in detail with reference to the accompanying drawings.

First Embodiment

Figure 2:
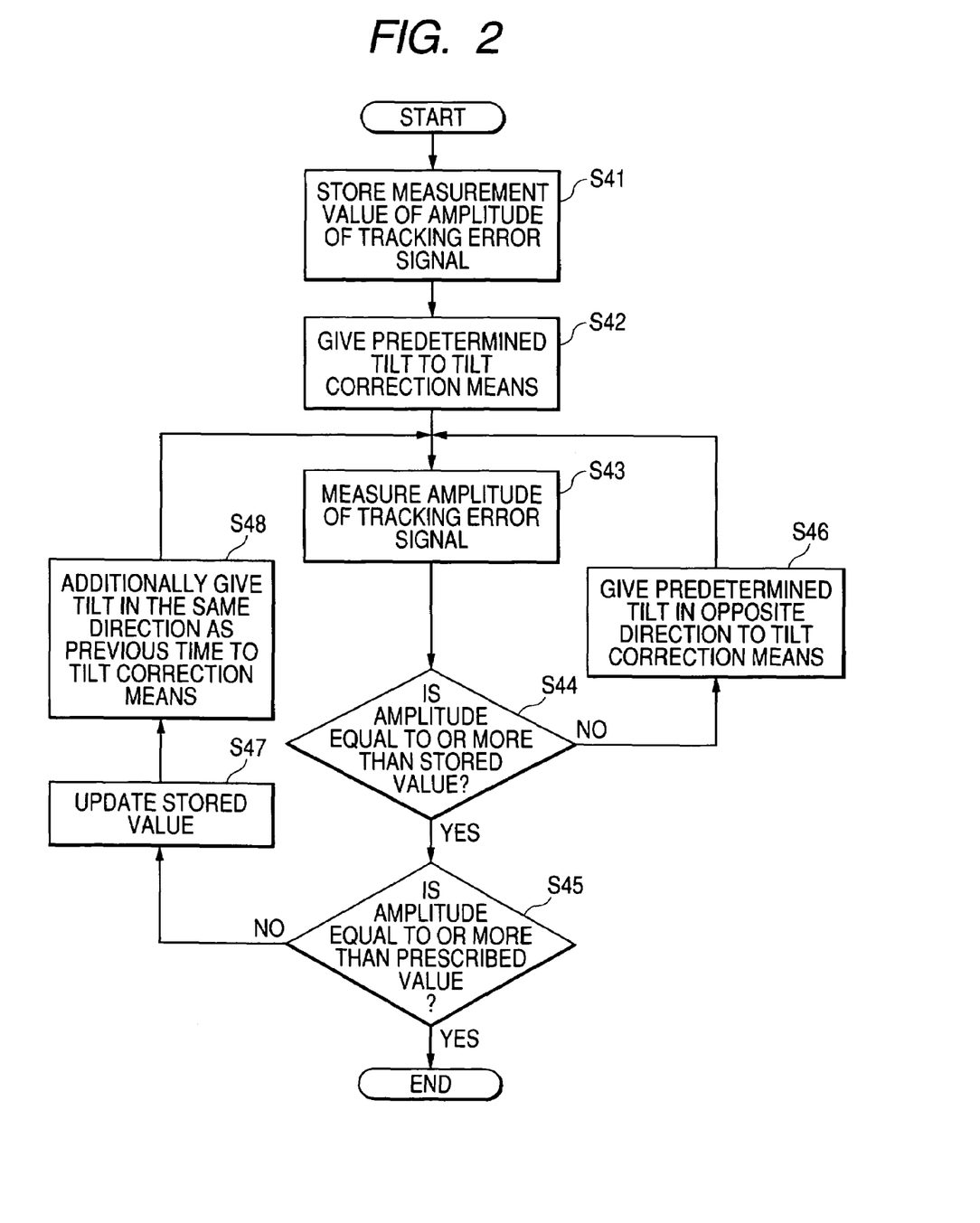
FIG. 2 is a flowchart for explaining a method of roughly correcting the relative tilt between the recording medium and the objective lens according to the first embodiment of the present invention.
Figure 3:
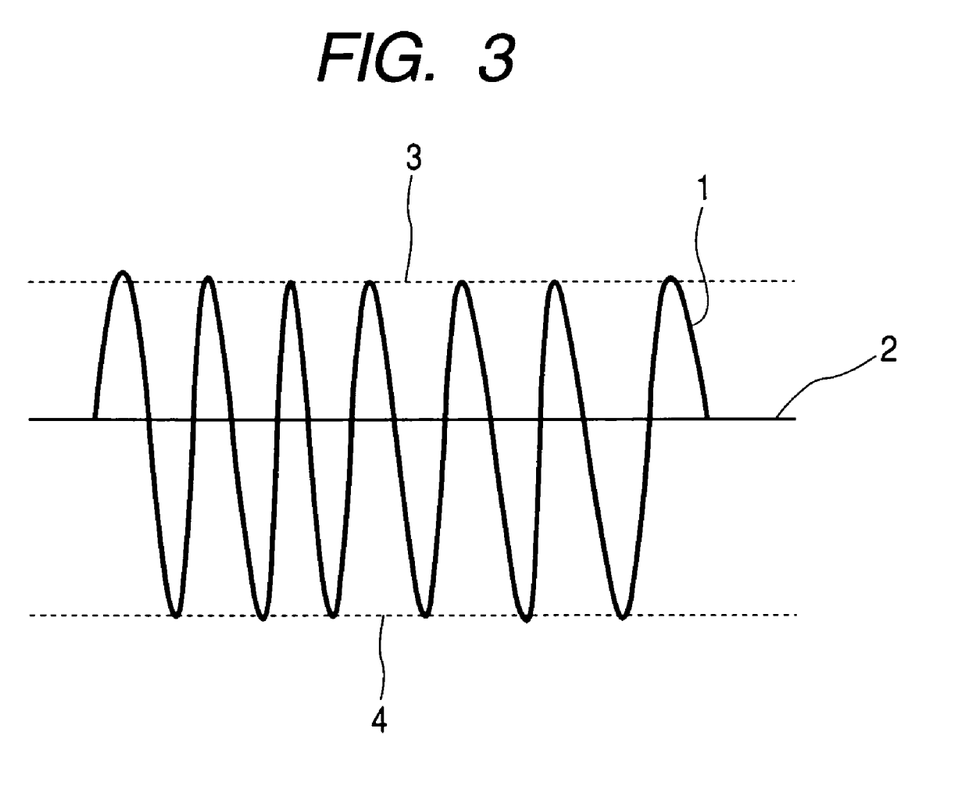
FIG. 3 shows a tracking error signal waveform measured.

A method of correcting a relative tilt between a recording medium and an objective lens according to a first embodiment of the present invention will be described with reference to FIGS. 1 to 3.

In the first embodiment of the present invention, the tracking error signal 26 is used as a predetermined signal recorded on the optical disk in advance. FIG. 1 is a flowchart for explaining the relative tilt correction method according to the first embodiment of the present invention. Also, FIG. 2 is a flowchart for explaining the details of tilt rough correction shown in FIG. 1. Further, FIG. 3 shows a tracking error signal waveform measured.

As a means for detecting the relative tilt between the optical disk 11 that is the recording medium and the objective lens 13 and for generating the tilt detection signal 24, it is possible to use the method shown in FIG. 9. Also, as a means for correcting the relative tilt between the optical disk 11 that is the recording medium and the objective lens 13 based on the tilt detection signal 24, it is possible to use the tilt actuator 14 shown in FIG. 7 that has the function of inclining the objective lens 13. Alternatively, the liquid crystal tilt correction element 19 shown in FIG. 8 may be used.

Hereinafter, the method of correcting the relative tilt between the recording medium and the objective lens according to the first embodiment of the present invention will be described with reference to FIGS. 1 to 3.

(1) First, in step S1, pull-in of a focus servo is performed.

(2) Next, in step S2, under a state where the focus servo is driven, the tracking error signal 26 is generated from a pencil of light guided onto the sensor (photodetector) 17 and a tracking error signal amplitude is measured. The tracking error signal 26 is generated by guiding the diffraction pattern 20, which is generated at the time when a light spot goes across guide grooves for tracking provided on the recording medium, to the 6-segment sensor (6-segment photodetector) (17a to 17f) and by following the procedure described with reference to FIG. 9. A tracking error signal waveform 1 is shown in FIG. 3. In this drawing, reference numeral 2 denotes a reference voltage. The maximum value 3 and the minimum value 4 of variations of the tracking error signal waveform 1 within a fixed period of time are measured and the tracking error signal amplitude is obtained from a difference between the maximum value 3 and the minimum value 4. It is preferable that the tracking error signal 26 be normalized using a sum signal (17a+17b+17c+17d+17e+17f) of the pencil of light guided onto the photodetector 17 because it becomes possible to obtain a tracking error signal amplitude that is not influenced by the reflectance of the recording medium.

(3) Then, in steps S3 and S4, tilt rough correction (which corresponds to a portion in FIG. 1 surrounded by a dotted line and whose detailed description will be made later with reference to FIG. 2) is performed until the tracking error signal amplitude becomes equal to or more than a prescribed value (threshold value).

(4) Next, in step S5, gain adjustment of a tracking servo is performed as necessary.

(5) Following this, in step S6, tracking pull-in is performed.

(6) Finally, in step S7, under a state where the tracking servo is driven, fine correction of the tilt is performed using the tilt detection signal 24 generated through the procedure described with reference to FIG. 9. In the tilt fine correction, the objective lens 13 is inclined using the tilt actuator 14 so that the tilt detection signal 24 becomes zero. When the liquid crystal tilt correction element 19 is used, the liquid crystal cell is caused to generate an optical phase difference so that the tilt detection signal 24 becomes zero.

In this manner, it is possible to perform precise relative tilt correction using the tilt detection signal 24 obtained from a pencil of light guided onto the photodetector 17 under a state where the tracking servo is driven. When doing so, the amplitude value of the tracking error signal 26 is measured and the tilt rough correction is performed in advance in steps S3 and S4, so it becomes possible to perform tracking pull-in with stability, which makes it possible to perform precise relative tilt correction with reliability using the tilt detection signal 24.

Next, an example of the tilt rough correction will be described with reference to FIG. 2. FIG. 2 corresponds to the portion in FIG. 1 surrounded by the dotted line and step S4 in the above description.

Figure 1:
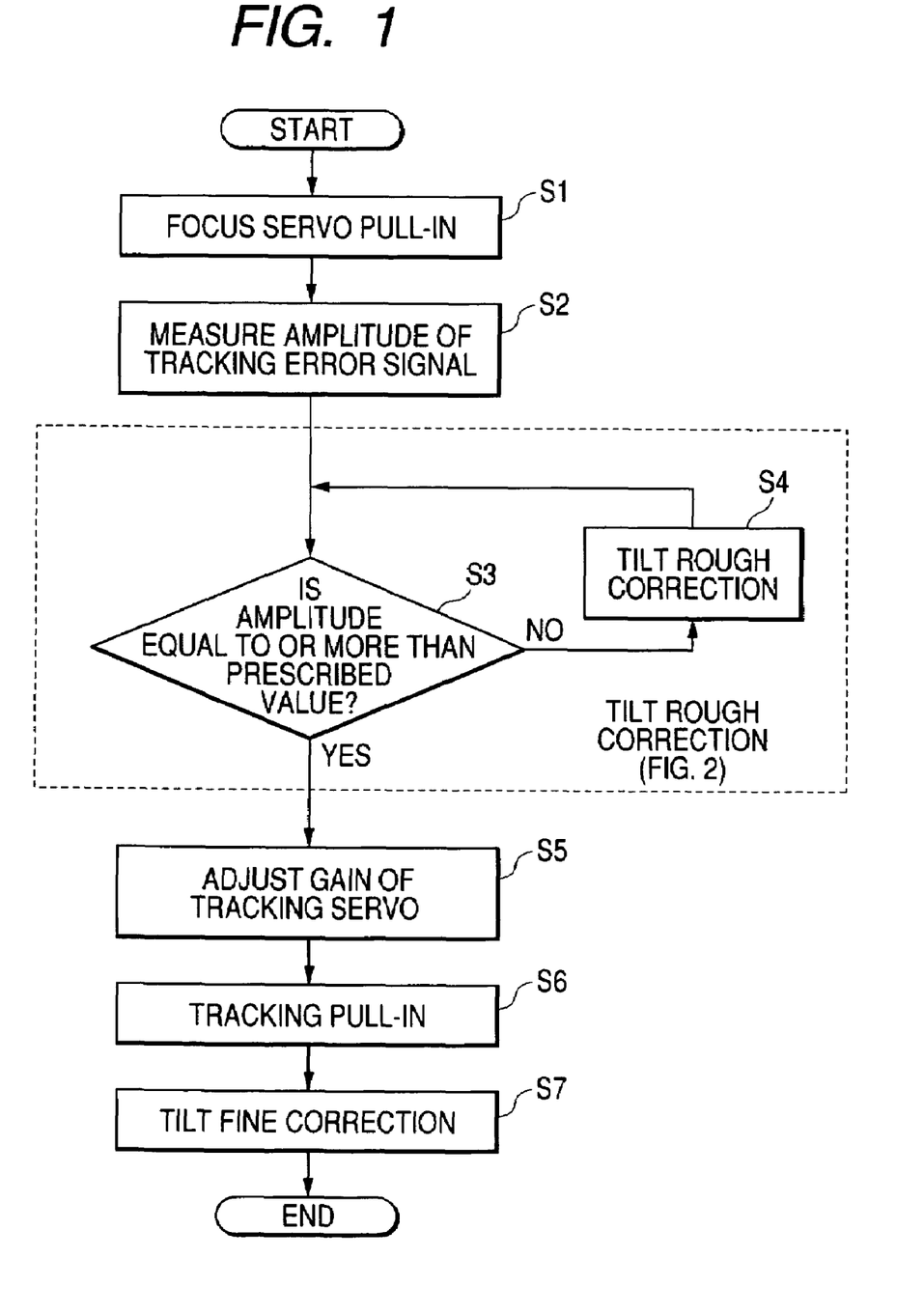
FIG. 1 is a flowchart for explaining a method of correcting a relative tilt between a recording medium and an objective lens according to a first embodiment of the present invention.

(1) First, in step S41, a measurement value of the tracking error signal amplitude measured in step S2 in FIG. 1 is stored in a memory (not shown).

(2) Next, in step S42, a predetermined tilt is given to the objective lens 13 using the tilt actuator 14. The predetermined tilt amount given in this step is determined with reference to a laser wavelength used in the optical pickup 12, the NA of the objective lens 13, and an optical disk substrate thickness. When the laser wavelength λ is 405 nm, the NA of the objective lens is 0.65, and the optical disk substrate thickness is 0.6 mm, it is preferable that a tilt of 0.2° to 0.3° be given. When the liquid crystal tilt correction element 19 is used, the liquid crystal cell is caused to generate an optical phase difference corresponding to that generated when the objective lens 13 is inclined by 0.2° to 0.3° with respect to the optical disk 11 that is the recording medium. For instance, a tilt of 0.2° or a phase difference corresponding to the tilt is given.

(3) Next, in step S43, the tracking error signal amplitude is measured.

(4) Following this, in step S44, it is judged whether the signal amplitude is equal to or more than the stored value. If the result of this judgment is positive, it is then judged in step S45 whether the signal amplitude is equal to or more than the prescribed value (threshold value) determined in advance. On the other hand, if the result of the judgment in step S44 is negative, the processing proceeds to step S46 in which an inclination of −0.4° is given to thereby incline the objective lens 13 by 0.2° in a direction opposite to the inclination given in step S42.

(5) Then, in step S43, the tracking error signal amplitude is measured.

(6) Following this, in step S44, it is judged whether the signal amplitude is equal to or more than the stored value, and if the result of this judgment is positive, it is then judged in step S45 whether the signal amplitude is equal to or more than the prescribed value (threshold value) determined in advance.

(7) If it is judged in step S45 that the signal amplitude is equal to or more than the prescribed value (threshold value) (YES), the rough adjustment is ended. On the other hand, if it is judged that the signal amplitude is less than the prescribed value (threshold value) (NO), the stored value is updated to the latest measurement value of the signal amplitude in step S47 and the objective lens 13 is further inclined by 0.2° in the same direction as previous time in step S48.

(8) Then, in step S43, the tracking error signal amplitude is measured.

(9) Following this, the operations from steps S44 to S48 are repeated and when the signal amplitude becomes equal to or more than the prescribed value (threshold value) determined in advance, the rough adjustment is ended and the processing proceeds to step S5 of FIG. 1.

It is not necessarily required that the tilt rough correction is performed through steps S41 to S48. For instance, the tilt rough correction may be performed by sequentially giving predetermined tilt amounts (increased in increments of about 0.2° and set at . . . −0.8°, −0.6°, −0.4°, −0.2°, 0°, +0.2°, +0.4°, +0.6°, +0.8° . . . , for instance) to the objective lens, measuring the tracking error signal amplitude for each tilt, and obtaining an objective lens tilt amount with which the tracking error signal amplitude becomes equal to or more than the prescribed value (threshold value). Alternatively, the tilt rough correction may be performed by measuring the tracking error signal amplitude for each tilt in a like manner, obtaining the maximum value of the amplitude by computing a polynomial approximation of the tracking error signal amplitudes, and giving a tilt amount in proximity to the maximum value to the objective lens to thereby set the signal amplitude equal to or more than the prescribed value (threshold value). However, when plural tilt amounts are sequentially given using the tilt actuator 14 as the tilt correction means, it is required to pay attention to contact between the tilt actuator 14 and the optical disk 11 that is the recording medium.

It should be noted here that it is preferable to set the prescribed value for the tracking error signal amplitude at around 70% of the maximum amplitude value. This corresponds to a tilt of approximately 0.4° when the laser wavelength λ is set at 405 nm, the NA of the objective lens is set at 0.65, and the optical disk substrate thickness is set at 0.6 mm (see FIG. 10). By performing the rough adjustment until the tracking error signal amplitude becomes greater than 70% of the maximum amplitude value, it becomes possible to drive the tracking servo with reliability, which makes it possible to perform the tilt fine adjustment precisely while referring to the tilt detection signal.

While the rough correction described above does not necessarily require use of the tilt sensor 18 shown in FIGS. 7 and 8, the tilt sensor 18 may be used in combination in order to control the predetermined tilt amount increments in the rough correction.

As described above, the amplitude value of the tracking error signal 26 is measured and the relative tilt rough correction is performed in advance, so it becomes possible to perform the tracking pull-in (S6) that is the subsequent step with stability, which makes it possible to perform precise relative tilt correction swiftly and with reliability using the tilt detection signal 24.

Second Embodiment

A method of correcting a relative tilt between a recording medium and an objective lens according to a second embodiment of the present invention will be described with reference to FIGS. 4 to 6.

In the second embodiment of the present invention, the sum signal of the pencil of light guided onto the photodetector 17 is used as a predetermined signal recorded on the optical disk 11 as the recording medium in advance. FIG. 4 is a flowchart for explaining the relative tilt correction method according to the second embodiment of the present invention. Also, FIG. 5 is a flowchart for explaining the details of tilt rough correction shown in FIG. 4. Further, FIG. 6 shows a sum signal waveform measured.

As a means for detecting the relative tilt between the optical disk 11 and the objective lens 13 and for generating the tilt detection signal 24, it is possible to use the method shown in FIG. 9 as in the first embodiment. Also, as a means for correcting the relative tilt between the optical disk 11 and the objective lens 13 based on the tilt detection signal 24, it is possible to use the tilt actuator 14 shown in FIG. 7 that has the function of inclining the objective lens 13. Alternatively, the liquid crystal tilt correction element 19 shown in FIG. 8 may be used.

Hereinafter, the method of correcting the relative tilt between the recording medium and the objective lens according to the second embodiment of the present invention will be described with reference to FIGS. 4 to 6.

(1) First, in step S11, pull-in of a focus servo is performed.
(2) Next, in step S12, under a state where the focus servo is driven, the sum signal is generated from a pencil of light guided onto the sensor (photodetector) 17 and a signal amplitude is measured. The sum signal is generated by guiding the diffraction pattern 20, which is generated at the time when a light spot goes across guide grooves for tracking provided on the recording medium, to the 6-segment sensor (6-segment photodetector) (17a to 17f).

$$\text{sum signal} = 17a + 17b + 17c + 17d + 17e + 17f \quad (4)$$

Figure 6:
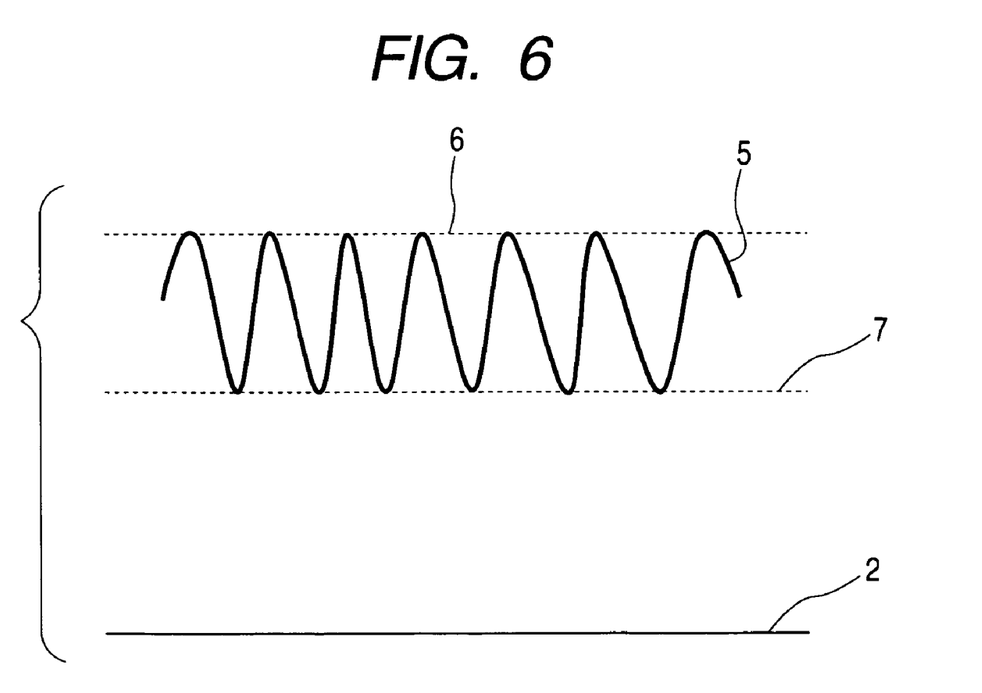
FIG. 6 shows a sum signal waveform measured.

A sum signal waveform 5 is shown in FIG. 6. In this drawing, reference numeral 2 denotes a reference voltage. The maximum value 6 and the minimum value 7 of variations of the signal waveform 5 within a fixed period of time are measured and the sum signal amplitude is obtained from a difference between the maximum value 6 and the minimum value 7. It is preferable that the sum signal amplitude be normalized using the maximum value 6 because it becomes possible to obtain a sum signal amplitude that is not influenced by the reflectance of the optical disk 11.

(3) Then, in steps S13 and S14, tilt rough correction (which corresponds to a portion in FIG. 4 surrounded by a dotted line and whose detailed description will be made later with reference to FIG. 5) is performed until the sum signal amplitude becomes equal to or more than a prescribed value (threshold value).
(4) Next, in step S15, gain adjustment of a tracking servo is performed as necessary.
(5) Following this, in step S16, tracking pull-in is performed.
(6) Finally, in step S17, under a state where the tracking servo is driven, fine correction of the tilt is performed using the tilt detection signal 24 generated through the procedure described with reference to FIG. 9. In the tilt fine correction, the objective lens 13 is inclined using the tilt actuator 14 so that the tilt detection signal 24 becomes zero. When the liquid crystal tilt correction element 19 is used, the liquid crystal cell is caused to generate an optical phase difference so that the tilt detection signal 24 becomes zero.

In this manner, it is possible to perform precise relative tilt correction using the tilt detection signal 24 obtained from a pencil of light guided onto the photodetector 17 under a state where the tracking servo is driven. When doing so, the amplitude value of the sum signal is measured in advance in step S12 and the relative tilt rough correction is performed, so it becomes possible to perform tracking pull-in with stability, which makes it possible to perform precise relative tilt correction with reliability using the tilt detection signal 24.

Next, an example of the tilt rough correction will be described with reference to FIG. 5. FIG. 5 corresponds to the portion in FIG. 4 surrounded by the dotted line and step S14 in the above description.

Figure 4:
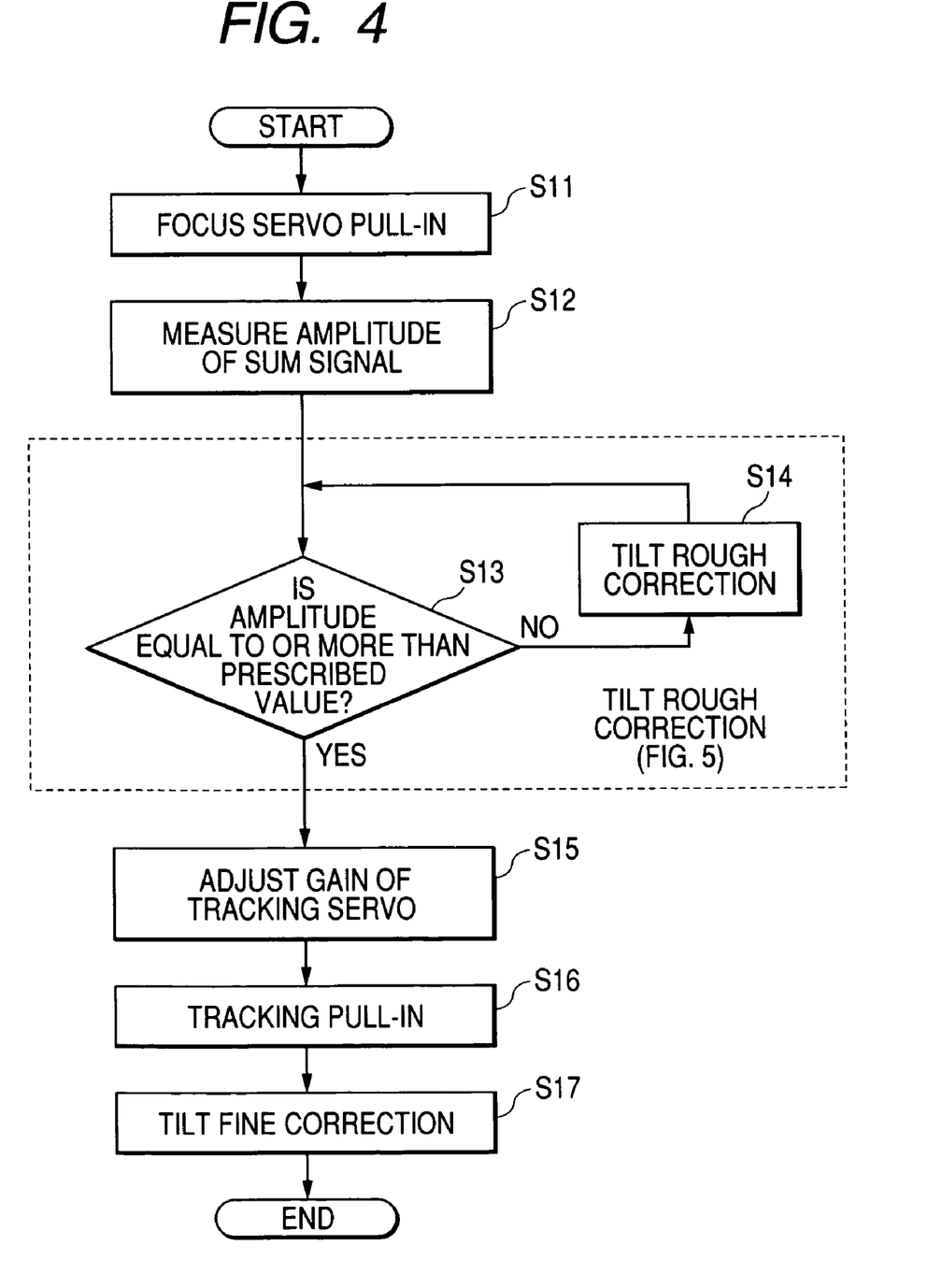
FIG. 4 is a flowchart for explaining a method of correcting a relative tilt between a recording medium and an objective lens according to a second embodiment of the present invention.
Figure 5:
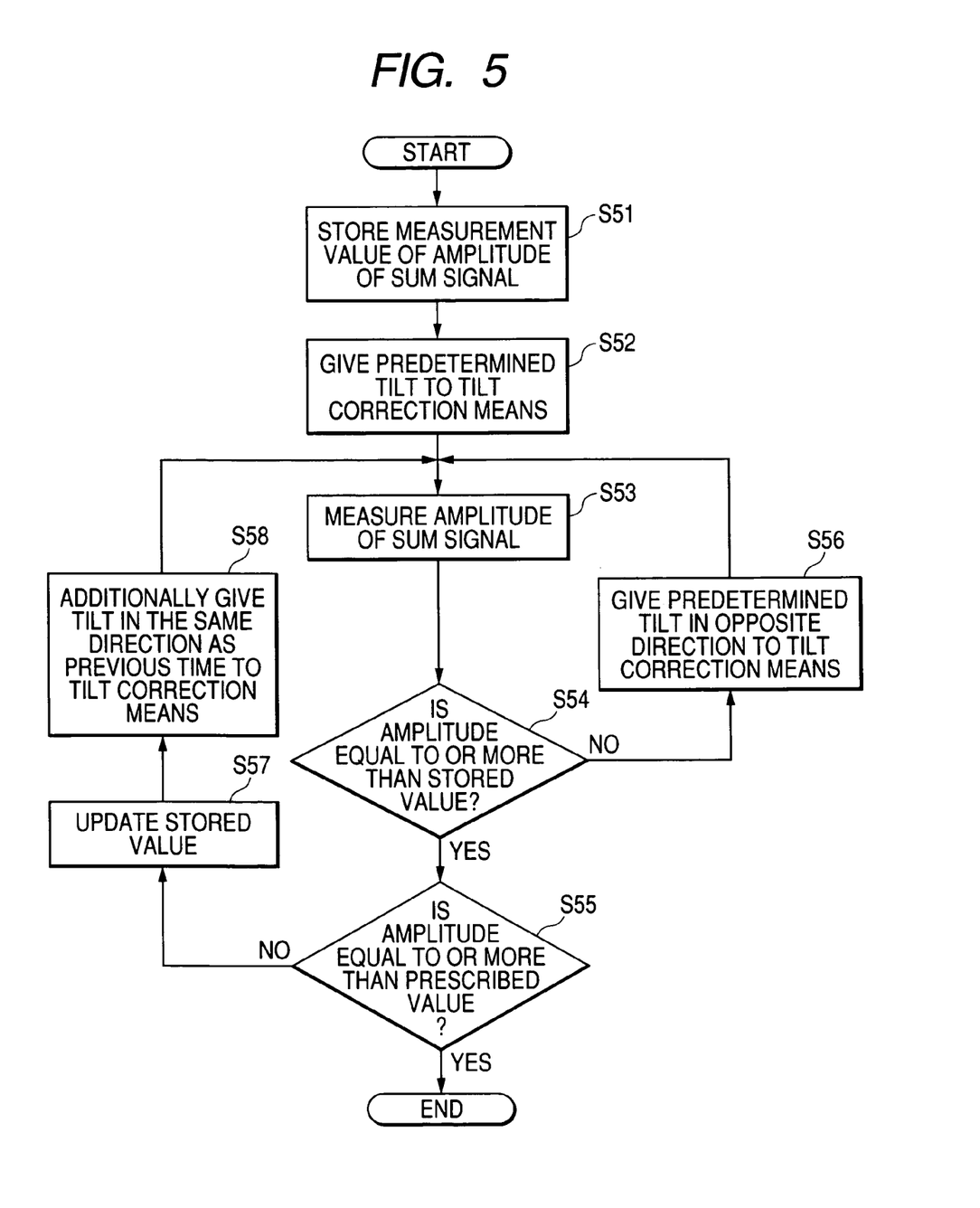
FIG. 5 is a flowchart for explaining a method of roughly correcting the relative tilt between the recording medium and the objective lens according to the second embodiment of the present invention.

(1) First, in step S51, a measurement value of the sum signal amplitude measured in step S12 in FIG. 4 is stored in a memory (not shown).
(2) Next, in step S52, a predetermined tilt is given to the objective lens 13 using the tilt actuator 14. The predetermined tilt amount given in this step is determined with reference to a laser wavelength of the optical pickup used, the NA of the objective lens, and an optical disk substrate thickness. When the laser wavelength λ is 405 nm, the NA of the objective lens is 0.65, and the optical disk substrate thickness is 0.6 mm, it is preferable that a tilt of 0.2° to 0.3° be given. When the liquid crystal tilt correction element 19 is used, the liquid crystal cell is caused to generate an optical phase difference corresponding to that generated when the objective lens 13 is inclined by 0.2° to 0.3° with respect to the recording medium 11. For instance, a tilt of 0.2° or a phase difference corresponding to the tilt is given.
(3) Next, in step S53, the sum signal amplitude is measured.
(4) Following this, in step S54, it is judged whether the sum signal amplitude is equal to or more than the stored value. If the result of this judgment is positive, it is then judged in step S55 whether the sum signal amplitude is equal to or more than the prescribed value (threshold value) determined in advance. On the other hand, if the result of the judgment in step S54 is negative, an inclination of −0.4° is given to thereby incline the objective lens 13 by 0.2° in a direction opposite to the inclination given in step S52.
(5) Then, in step S53, the sum signal amplitude is measured.
(6) Following this, in step S54, it is judged whether the sum signal amplitude is equal to or more than the stored value and if the result of this judgment is positive, it is then judged in step S55 whether the sum signal amplitude is equal to or more than the prescribed value (threshold value) determined in advance.
(7) If it is judged that the sum signal amplitude is equal to or more than the prescribed value (threshold value) (YES), the rough adjustment is ended. On the other hand, if it is judged that the sum signal amplitude is less than the prescribed value (threshold value) (NO), the stored value is updated to the latest measurement value of the signal amplitude in step S57 and the objective lens 13 is further inclined by 0.2° in the same direction as previous time in step S58.
(8) Then, in step S53, the sum signal amplitude is measured.
(9) Following this, the operations from steps S54 to S58 are repeated and when the signal amplitude becomes equal to or more than the prescribed value (threshold value) determined in advance, the rough adjustment is ended and the processing proceeds to step S15 of FIG. 4.

It is not necessarily required that the tilt rough correction is performed through steps S51 to S58. For instance, the tilt rough correction may be performed by sequentially giving predetermined tilt amounts (increased in increments of about 0.2° and set at . . . −0.8°, −0.6°, −0.4°, −0.2°, 0°, +0.2°, +0.4°, +0.6°, +0.8° . . . , for instance) to the objective lens, measuring the sum signal amplitude for each tilt, and obtaining an objective lens tilt amount with which the sum signal amplitude becomes equal to or more than the prescribed value (threshold value). Alternatively, the tilt rough correction may be performed by measuring the sum signal amplitude for each tilt in a like manner, obtaining the maximum value of the amplitude by computing a polynomial approximation of the sum signal amplitudes, and giving a tilt amount in proximity to the maximum value to the objective lens to thereby set the signal amplitude equal to or more than the prescribed value (threshold value). However, when plural tilt amounts are sequentially given using the tilt actuator 14 as the tilt correction means, it is required to pay attention to contact between the tilt actuator 14 and the optical disk 11 that is the recording medium.

It should be noted here that it is preferable to set the prescribed value for the sum signal amplitude at around 70% of the maximum amplitude value. This corresponds to a tilt of approximately 0.4° when the laser wavelength λ is set at 405 nm, the NA of the objective lens is set at 0.65, and the optical disk substrate thickness is set at 0.6 mm. By performing the rough adjustment until the sum signal amplitude becomes greater than 70% of the maximum amplitude value, the amplitude of the tracking error signal is also set at approximately 70% of the maximum amplitude value. Thus, it becomes possible to drive the tracking servo with reliability, which makes it possible to perform the tilt fine adjustment precisely while referring to the tilt detection signal.

While the rough correction described above does not necessarily require use of the tilt sensor 18 shown in FIGS. 7 and 8, the tilt sensor 18 may be used in combination in order to control the predetermined tilt amount increments in the rough correction.

As described above, the amplitude value of the sum signal is measured and the relative tilt rough correction is performed in advance, so it becomes possible to perform the tracking pull-in (S16) that is the subsequent step with stability, which makes it possible to perform precise relative tilt correction swiftly and with reliability using the tilt detection signal 24.

The present invention described above has the following effects.

With the present invention, it becomes possible to perform relative tilt detection with a high degree of relative tilt detection accuracy without using the tilt sensor described in the "Related Background Art" section of this specification. As a result, it becomes possible to provide a compact and portable optical pickup.

Also, when the relative tilt detection method with a high degree of relative tilt detection accuracy is used in combination with the tilt correction means such as a tilt actuator and a liquid crystal tilt correction element, it becomes possible to perform tilt control using a closed loop structure with ease. Therefore, with the present invention, in contrast to the conventional example where the relative tilt correction accuracy is on the order of 0.5° at most, it becomes possible to improve the relative tilt correction accuracy to around 0.1° because it becomes possible to measure a disk tilt amount with precision directly from a pencil of reflection light from the optical disk.

Further, when a tilt actuator or a liquid crystal tilt correction element is combined as the tilt correction means, it becomes possible to realize a closed loop control structure with ease. As a result, it becomes possible to perform relative tilt correction having responsiveness within an allowable range of the frequency characteristics of the tilt correction means.

Still further, with the present invention, the amplitude value of the tracking signal or the sum signal is measured and rough correction of the relative tilt is performed in advance. As a result, it becomes possible to perform tracking pull-in that is the subsequent step with stability, which makes it possible to perform precise relative tilt correction speedily and stably using the tilt detection signal.

This application claims priority from Japanese Patent Application No. 2003-405909 filed on Dec. 4, 2003, which is hereby incorporated by reference herein.

What is claimed is:

1. An optical information recording/reproducing apparatus comprising:
   a light source portion;
   an objective lens that gathers a pencil of light from the light source portion onto a recording medium;
   an optical system that guides a returning pencil of light from the recording medium onto a photodetector;
   means for generating a tracking error signal with respect to a predetermined track on the recording medium from the pencil of light guided onto the photodetector;
   means for performing tracking on the predetermined track on the recording medium based on the tracking error signal;
   means for generating a tilt detection signal by detecting a relative tilt between the recording medium and the objective lens from the pencil of light guided onto the photodetector;
   a tilt correction means for correcting the relative tilt between the recording medium and the objective lens based on the tilt detection signal;
   means for generating a predetermined signal recorded on the recording medium from the pencil of light guided onto the photodetector under a state where a tracking servo is not driven; and
   means for measuring a signal level of the predetermined signal,
   wherein the tilt correction means roughly corrects the relative tilt between the recording medium and the objective lens until the signal level reaches a threshold value determined in advance, and after the rough correction, under a state where the tracking means performs tracking on the predetermined track, the tilt detection signal generation means generates the tilt detection signal and the tilt correction means finely corrects the relative tilt between the recording medium and the objective lens based on the tilt detection signal.

2. The optical information recording/reproducing apparatus according to claim 1, wherein the predetermined signal is a tracking error signal.

3. The optical information recording/reproducing apparatus according to claim 1, wherein the predetermined signal is a sum signal of the photodetector.

4. An optical information recording/reproducing method comprising the steps of:
   gathering a pencil of light from a light source portion onto a recording medium by an objective lens and receiving a returning pencil of light from the recording medium with a photodetector through an optical system;
   driving a focus servo on the pencil of light based on an output of the photodetector;
   generating a predetermined signal recorded on the recording medium based on the output of the photodetector;
   measuring a signal level of the predetermined signal;
   roughly correcting a relative tilt between the recording medium and the objective lens under a state where a tracking servo is not driven until the signal level reaches a threshold value determined in advance;
   detecting, after the rough correction, a tilt detection signal indicating the relative tilt between the recording medium and the objective lens based on the output of the photodetector under a state where the tracking servo is driven on a predetermined track based on the output of the photodetector; and finely correcting the relative tilt between the recording medium and the objective lens based on the tilt detection signal.

5. The optical information recording/reproducing method according to claim 4, wherein the predetermined signal is a tracking error signal.

6. The optical information recording/reproducing method according to claim 4, wherein the predetermined signal is a sum signal of the photodetector.

7. An optical information recording and/or reproducing apparatus comprising:

a light source;

an objective lens that condenses a light beam from the light source on a recording medium;

an optical system that guides the light beam reflected from the recording medium onto a photodetector;

a circuit for generating a tracking error signal with respect to a predetermined track on the recording medium from an output of the photodetector;

a circuit for performing tracking servo to the predetermined track on the recording medium based on the tracking error signal;

a circuit for generating a tilt detection signal by detecting a relative tilt between the recording medium and the objective lens from the output of the photodetector; and a tilt correction circuit for correcting the relative tilt between the recording medium and the objective lens based on the tilt detection signal, wherein the tilt correction circuit roughly corrects the relative tilt between the recording medium and the objective lens while the tracking servo is in an off state so that an amplitude of the tracking error signal reaches more than a predetermined value, and after the rough correction, while the tracking servo is in an on state, the tilt correction circuit finely corrects the relative tilt between the recording medium and the objective lens based on the tilt detection signal.

* * * * *